Nov. 14, 1950  G. D. FISK  2,529,801
HINGED TELESCOPE GUN SIGHT MOUNT
Filed March 31, 1947

GEORGE D. FISK
INVENTOR.
BY
ATTORNEY

Patented Nov. 14, 1950

2,529,801

UNITED STATES PATENT OFFICE 2,529,801

HINGED TELESCOPE GUN SIGHT MOUNT

George D. Fisk, Bellflower, Calif.

Application March 31, 1947, Serial No. 738,287

6 Claims. (Cl. 33—50)

1

This invention relates to a telescope sight mount for rifles or the like, and particularly to a mounting that permits the telescope to be shifted from a sighting position to a retracted position at one side of the rifle.

Telescope sights are very inefficient for quick shooting at close range and especially if the target is moving. Therefore at times it becomes desirable to be able to quickly retract the telescope to permit the use of the conventional open sights. In another instance, if a close moving target has stopped or reached a range where the use of the telescope would be advantageous, it becomes desirable to quickly restore the telescope to sighting position.

It is a general object of the invention to provide a mounting for a telescope sight capable of quick retraction from its sighting position to avail the conventional open sight for optional use, and which can be restored quickly to accurate sighting position.

A particular object of the invention is to provide a simple pivotal connection between the telescope and the rifle to permit shifting of the telescope from sighting position to a retracted position and the incorporation of a lock in the connection for positively locking the telescope in one or both of the positions. It is preferred that the lock be released by axial movement of the telescope to permit free shifting of the telescope. Thus by slight axial movement of the telescope, it may be shifted into or out of sighting position.

A structural feature of the lock contemplated by the invention is the provision of a tapered pin that is adapted to register with a straight opening when the telescope is in sighting position. The tapered pin cooperating with the outer edge of the straight opening provides a minimum amount of contact and assurance of perfect alinement between the telescope sight and the rifle barrel, each time the telescope is brought into sighting position. If desired, spaced registering openings may be provided for reception of a tapered pin to lock the telescope in both sighting and retracted positions. Further I provide a spring for yieldingly holding the pin in the selected opening, preventing accidental shifting of the telescope.

Other objects and features as well as the abovementioned will be more clearly understood from the following detailed description of a preferred embodiment of the invention throughout which reference is had to the accompanying drawing, in which:

2

Figure 1:
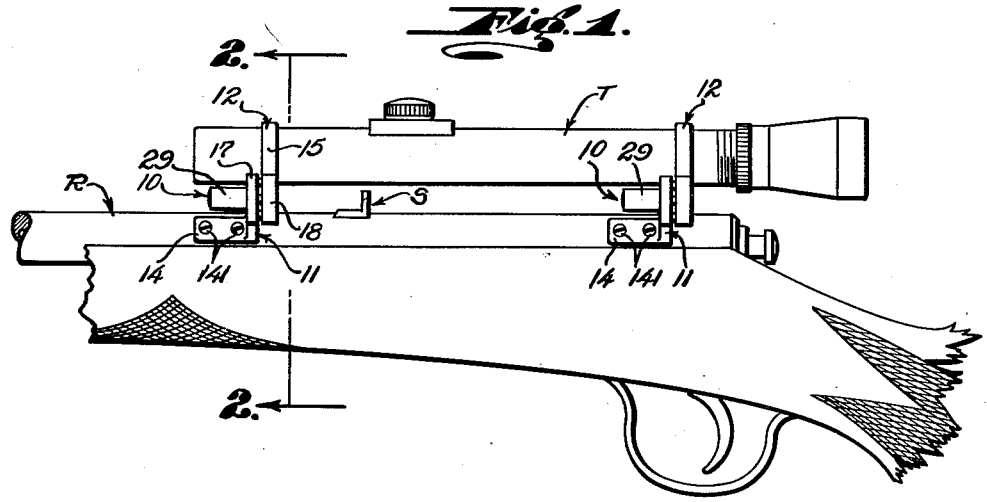
Fig. 1 is a side elevation of the mounting for connecting a telescope sight to a rifle.
Figure 2:
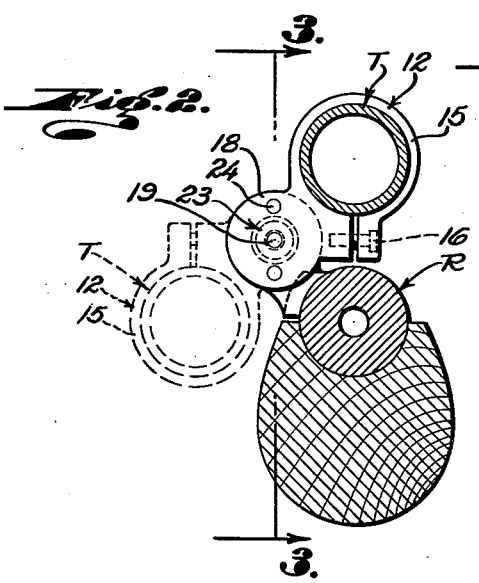
Fig. 2 is an enlarged transverse sectional view taken on line 2—2 of Fig. 1.
Figure 3:
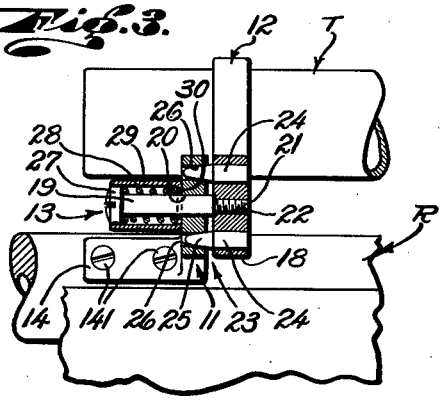
Fig. 3 is an enlarged axial view taken on line 3—3 of Fig. 2.
Figure 4:
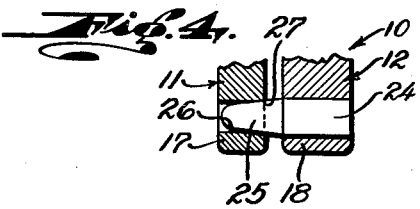
Fig. 4 is an enlarged fragmentary view of the lock embodied in the mounting.

In Figs. 1 to 4 of the drawings I have typically illustrated the telescope T connected with a rifle R by a pair of spaced mountings 10. The latter are identical in construction, each including a pair of members 11 and 12 attached to the rifle and telescope respectively, and a pivotal connection 13 permitting shifting of the telescope from a sighting position as shown in the drawings, to a retracted position illustrated in dotted lines in Fig. 2. While the member 11 is preferably provided with a foot 14 attached to the side of the rifle R by screws 141 threaded into the rifle barrel, in some installations it may be desirable to attach the member 11 to the stock of the rifle. The member 12 is provided with a clamp ring 15 surrounding the telescope and held in clamping engagement therewith by a screw 16. Each of the members 11 and 12 are provided with an offset lug 17 and 18 respectively, forming parts of the pivotal connection 13. The connection 13 includes a pin 19 rotatably received in a central opening 20 in the lug 17 of the member 11, and having a reduced end 21 threaded into a central opening 22 in the lug 18 of the member 12.

A principal feature of the invention is the provision of a positive lock 23 in the connection 13 for holding the telescope in accurate alinement with the rifle barrel when in the sighting position, and also in a retracted position. The locking means 23 includes a pair of pins 24 spaced diametrically opposite the pivot pin 19 and equidistances therefrom. The pins 24 are provided with tapered ends 25 to be received in registering openings 26 positioned diametrically opposite the opening 20. The openings 26 are preferably straight to provide for line contact at 27 between the edges of the openings 26 and the conical surfaces of the tapered ends 25 of the pins. Looking forwardly, as viewed in Fig. 2, the lugs 17 and 18 are offset to the left of the vertical plane of the rifle barrel and the pins 24 and their registering openings 26 are in a common vertical plane with the pivot pin 19. The telescope T when in sighting position is directly above the conventional open sights S, in alinement with the barrel of the rifle and preferably in the same vertical plane therewith.

As contemplated by the invention, I provide limited axial movement between the members 11 and 12 to allow for retraction of the pins 24 from the openings 26 to permit shifting of the telescope. I have illustrated the head 27 of the pin 19 spaced from the member 11 and a spring 28 housed by a sleeve 29 and arranged under compression between the head 27 and an internal flange 30 on the sleeve 29. The sleeve 29 also receives the head 27 of the pin 19. It will be seen how the spring 28 urges the member 12, through its engagement with the head 27 of the pin 19, forwardly relative to the member 11, thus yieldingly urging the tapered portions 25 of the pins into the openings 26. In the arrangement shown in Figs. 1 to 4 where the member 11 attached to the rifle is positioned ahead of the member 12 attached to the telescope, any recoil of the rifle will cause the tapered portions 25 of the pins to be more tightly received in their openings rather than produce any tendency to retract them.

To shift the telescope from the sighting position to the retracted position at one side of the rifle, the telescope is given a slight rearward axial movement relative to the rifle, compressing the spring 28 and retracting the tapered portions 25 of the pins from the openings 26. Upon retraction of the pins from the openings, the telescope is free to be shifted to its retracted position by rotation on the pin 19 180° to transpose the tapered portions 25 of the pins to be again received in the openings 26, locking the telescope in the retracted position. It is apparent how the telescope may be quickly shifted from sighting position to retracted position and back to sighting position, and how the lock assures perfect alinement each time.

Figure 5:
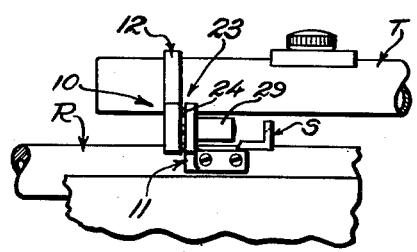
Fig. 5 is a fragmentary side elevation of the connection illustrating the parts assembled in reverse to Fig. 1.

In Fig. 5 I have shown the mounting 10 with its parts mounted in the reverse direction, where the member 11 is attached to the rifle R rearwardly of the member 12 carrying the telescope. It may be preferred in some instances to mount the telescope in this manner where its lock 23 is released by forward axial movement of the telescope, differing from the rearward axial movement described above. In small caliber rifles where the recoil is not sufficient to overcome the spring 28 and cause accidental displacement of the pins 24 from their openings and premature shifting of the telescope, this arrangement may be used.

I claim:

1. A mount for a telescope gun sight comprising a first member attachable to a gun, a second member attachable to a telescope, said members having adjacent connecting lugs projecting transversely from the gun and telescope respectively and received one behind the other, means connecting said second member to the first through said lugs for relative swinging movement about an axis extending longitudinally of the gun barrel and for limited movement in the direction of said axis, whereby the telescope may be swung about said axis between a sighting position above the gun and a retracted position at the side of the gun, one of said lugs having a pair of openings spaced angularly about said axis and located a common radial distance therefrom, a pin projecting axially from the other lug at said distance from the axis and movable axially into one of said openings in the sighting position of the telescope and into the second opening in its retracted position, and yielding means urging said lugs axially together to move the pin into the openings in said two positions respectively.

2. A mount for a telescopic gun sight comprising a first member attachable to a gun, a second member attachable to a telescope, said members having adjacent connecting lugs projecting transversely from the gun and telescope respectively and received one behind the other, means connecting said second member to the first through said lugs for relative swinging movement about an axis extending longitudinally of the gun barrel and for limited movement in the direction of said axis, whereby the telescope may be swung about said axis between a sighting position above the gun and a retracted position at the side of the gun, one of said lugs having a pair of openings spaced angularly about said axis and located a common radial distance therefrom, each of said openings having a straight cylindrical axially extending wall, a tapered pin projecting axially from the other lug at said distance from the axis and movable axially into one of said openings in the sighting position of the telescope and into the second opening in its retracted position, and yielding means urging said lugs axially together to move the pin into the openings in said two positions respectively.

3. A mount for a telescopic gun sight comprising a first member attachable to a gun, a second member attachable to a telescope, said members having adjacent connecting lugs projecting transversely from the gun and telescope respectively and received one behind the other, means connecting said second member to the first through said lugs for relative swinging movement about an axis extending longitudinally of the gun barrel and for limited movement in the direction of said axis, whereby the telescope may be swung about said axis between a sighting position above the gun and a retracted position at the side of the gun, one of said lugs having a plurality of openings spaced equally about said axis and located a common radial distance therefrom, a plurality of pins projecting axially from the other lug at locations spaced in correspondence with said openings and movable axially into said openings in said positions of the telescope, and yielding means urging the members axially together to move the pins into said openings in said positions respectively.

4. A mount for a telescope gun sight comprising a first member attachable to a gun, a second member attachable to a telescope, said members having adjacent connecting lugs projecting transversely from the gun and telescope respectively and received one behind the other, a pivot pin projecting from one of said lugs and extending through an opening in the second lug to project from its opposite side and thereby mount the telescope for swinging movement about the axis of the pin and for limited movement in the direction of said axis, one of said lugs having a pair of openings spaced angularly about said pivot pin and located a common radial distance therefrom, a positioning pin projecting axially from the other lug at said distance from the pivot pin and movable axially into one of said openings in a sighting position of the telescope and into the other opening in a retracted position, and a spring extending about said pivot pin at said opposite side of the second lug and urging the members axially together to move the positioning pin into said openings in said positions respectively.

5. A mount for a telescope gun sight comprising a first member attachable to a gun, a second member attachable to a telescope, said members having adjacent connecting lugs projecting transversely from the gun and telescope respectively and received one behind the other, a pivot pin projecting from one of said lugs and extending through an opening in the second lug to project from its opposite side and thereby mount the telescope for swinging movement about the axis of the pin and for limited movement in the direction of said axis, one of said lugs having a pair of openings spaced angularly about said pivot pin and located a common radial distance therefrom, a positioning pin projecting axially from the other lug at said distance from the pivot pin and movable axially into one of said openings in a sighting position of the telescope and into the other opening in a retracted position, a spring extending about said pivot pin at said opposite side of the second lug and urging the members axially together to move the positioning pin into said openings in said positions respectively, and a tubular shield projecting from said opposite side of the second lug and extending about said pivot pin and spring.

6. A mount for a telescopic gun sight comprising a first member attachable to a gun, a second member attachable to a telescope, said members having adjacent connecting lugs projecting transversely from the gun and telescope respectively and received one behind the other, a pivot pin projecting from one of said lugs and extending through an opening in the second lug to project from its opposite side and thereby mount the telescope for swinging movement about the axis of the pin and for relative movement in the direction of said axis, said pivot pin having a head at said opposite side of the second lug limiting said axial movement of the telescope, one of said lugs having a pair of openings spaced angularly about said pivot pin and located a common radial distance therefrom, a positioning pin projecting axially from the other lug at said distance from the pivot pin and movable axially into one of said openings in a sighting position of the telescope and into the other opening in a retracted position, a tubular shield projecting from said opposite side of the second lug about said pivot pin and having an inner transverse shoulder, and a coil spring extending about said pivot pin within the shield and bearing against said transverse shoulder of the shield and said head of the pin to urge the members axially together and thereby move the positioning pins into said openings.

GEORGE D. FISK.

REFERENCES CITED

The following references are of record in the file of this patent:

UNITED STATES PATENTS

| Number | Name | Date |
| --- | --- | --- |
| 1,083,288 | Lowe | Jan. 6, 1914 |
| 1,226,172 | Benjamin | May 15, 1917 |
| 2,115,618 | Carl | Apr. 26, 1938 |
| 2,385,176 | White | Sept. 18, 1945 |
| 2,425,130 | Shelley | Aug. 5, 1947 |
| 2,445,087 | Rogers | July 13, 1948 |

FOREIGN PATENTS

| Number | Country | Date |
| --- | --- | --- |
| 468,237 | Great Britain | of 1937 |